Sept. 18, 1923.

F. J. SPIEGLER

HANDLE

Filed Dec. 20, 1922

1,468,409

Inventor:
Frederick J. Spiegler,
By Lynnforth, Lee, Chritton & Wiles,
Attys.

Patented Sept. 18, 1923.

1,468,409

UNITED STATES PATENT OFFICE.

FREDERICK J. SPIEGLER, OF CHICAGO, ILLINOIS.

HANDLE.

Application filed December 20, 1922. Serial No. 607,962.

*To all whom it may concern:*

Be it known that I, FREDERICK J. SPIEGLER, a citizen of the United States, residing at Chicago, in the county of Cook and State of Illinois, have invented new and useful Improvements in Handles, of which the following is a specification.

This invention relates to improvements in handles, and more especially to a handle adapted for ready attachment to and detachment from different containers. The handle is also so constructed that it may be easily and cheaply made, and is so designed that it may be locked on a container and at the same time serve as a lock for the lid of the container. Other features and advantages of my invention will appear more fully as I proceed with my specification.

Figure 1:
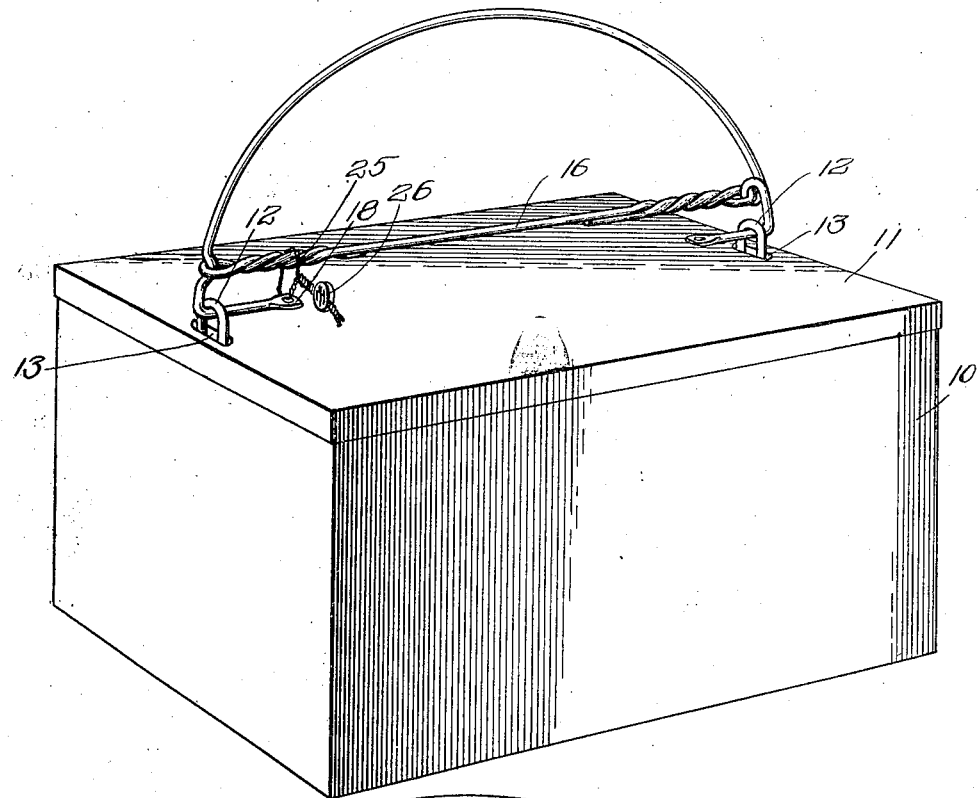
Figure 2:
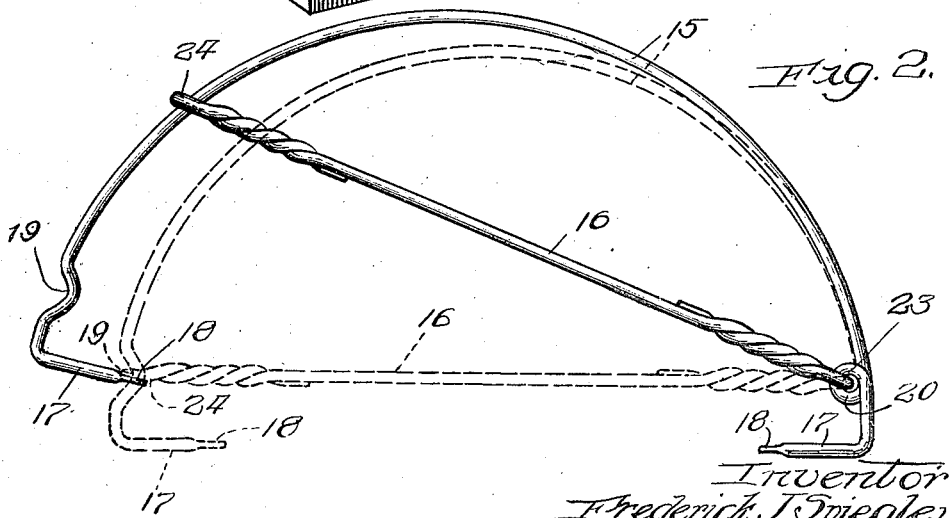

In that form of device embodying the features of my invention shown in the accompanying drawing, Fig. 1 is a view in perspective of my improved handle, showing the same locked in place on a container and Fig. 2 is a view in side elevation of the handle, showing the method of operating the same.

As shown in the drawing, 10 indicates a container of any kind, such as a box or crate adapted for packing eggs. There is provided a flat lid 11 for covering the container 10; and the side walls of the container are provided at the upper edges with staples 12, adapted to project through slots 13 in the lid 11.

My improved handle is preferably formed entirely of resilient wire or metal rod. It includes primarily a semi-circular springy part 15 and a locking bar 16. The ends of the part 15 are turned inwardly to form arms 17. The ends of the arm 17 are flattened and perforated, as indicated by 18. The semi-circular part 15 on one side near the arm 17 is provided with a kink 19 and on the other side in a similar position with a loop 20. The locking-bar 16 also has a loop at each end. One of these loops, 23, is engaged with the loop 20. The other loop 24 on the other end of the locking bar 16 encircles the semi-circular part 15.

The locking-bar 16 is of such a length, that when the loop 24 is in engagement with the kink 19, as shown in Fig. 1, and as shown by the broken lines in Fig. 2, the arms 17 will be drawn together sufficiently to lock them within the loops 12, as shown in Fig. 1. When the loop 24 on the locking-bar 16 is slipped upwardly on the semi-circular part 15, as shown by the solid lines in Fig. 2, there will be caused such a separation of the arms 17 as to permit their withdrawal from the loops or staples 12. When the handle is in locked position, as shown in Fig. 1, a wire 25 may be placed through one of the perforations in the flattened end 18 and then looped over the locking-bar 16 and sealed as by means of an ordinary pressed lead seal 26. This prevents the upward movement of the locking-bar 16 to unlock the handle. It is to be noted that when the handle is locked in position with the arm 17 in the staples 12, that the lid 11 is automatically locked on the container 10.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:—

1. A handle comprising a semi-circular portion carrying inwardly turned arms at its ends, and means for causing said arms to be moved toward or away from each other, said means comprising a bar having one end hingedly attached to said semi-circular portion near one of said arms and its other end slidably engaging with said semi-circular portion near the other end.

2. A handle comprising a semi-circular wire portion having inwardly extending arms at its ends, means for drawing the ends of said semi-circular wire portion together to bring said arms into locking position with respect to a container, and means for yieldingly retaining said arms in said locking position.

3. A handle comprising a resilient semi-circular portion having inwardly extending arms at its ends, means for drawing the ends of said resilient semi-circular portion together to bring said arms into locking position with respect to a container, and means for yieldingly retaining said arms in said locking position.

4. A handle comprising a semi-circular portion formed of resilient wire carrying near one end a loop, and a locking-bar having one end hingedly attached to said loop and the other end provided with a loop slidably mounted on said semi-circular portion.

5. A handle comprising a semi-circular portion formed of resilient wire carrying near one end a loop and near the other end a kink and a locking-bar hingedly attached at one end to said loop and provided at the other end with a loop encircling the semi-circular portion and adapted to be brought into yielding engagement with said kink.

Witness my hand and seal this 12 day of December, 1922.

FREDERICK J. SPIEGLER. [L. S.]